United States Patent
Sato et al.

(10) Patent No.: US 8,916,068 B2
(45) Date of Patent: Dec. 23, 2014

(54) SILVER MICROPOWDER, SILVER INK, SILVER COATING, AND METHODS FOR PRODUCTION OF THESE MATERIALS

(75) Inventors: Kimitaka Sato, Okayama (JP); Taku Okano, Kyoto (JP); Taro Nakanoya, Okayama (JP)

(73) Assignee: Dowa Electronics Materials Co., Ltd., Tokyo (JP)

(*) Notice: Subject to any disclaimer, the term of this patent is extended or adjusted under 35 U.S.C. 154(b) by 556 days.

(21) Appl. No.: 12/811,583

(22) PCT Filed: Dec. 25, 2008

(86) PCT No.: PCT/JP2008/073623
§ 371 (c)(1),
(2), (4) Date: Jul. 2, 2010

(87) PCT Pub. No.: WO2009/087918
PCT Pub. Date: Jul. 16, 2009

(65) Prior Publication Data
US 2010/0283013 A1    Nov. 11, 2010

(30) Foreign Application Priority Data
Jan. 6, 2008   (JP) .................. 2008-000220

(51) Int. Cl.
*H01B 1/22*   (2006.01)
*B32B 5/16*   (2006.01)
(Continued)

(52) U.S. Cl.
CPC .. *C09C 1/62* (2013.01); *H01B 1/22* (2013.01); *C09D 5/24* (2013.01); *B22F 2998/00* (2013.01);
(Continued)

(58) Field of Classification Search
CPC ............ B32B 5/16; H01B 1/22; C09D 11/02
See application file for complete search history.

(56) References Cited

U.S. PATENT DOCUMENTS

2003/0199162 A1* 10/2003 Seki ..................... 438/681
2008/0124238 A1*  5/2008 Atsuki et al. ............. 419/10
(Continued)

FOREIGN PATENT DOCUMENTS

| JP | 2006-089786 | 4/2006 |
| JP | 2006-169613 | 6/2006 |

(Continued)

OTHER PUBLICATIONS

Masami Nakamoto et al., "Application of Silver Nanoparticles to Conductive Pastes", Chemical Industry, by Kagaku Kogyo-sha, Oct. 2005, pp. 749-754.

*Primary Examiner* — Randy Gulakowski
*Assistant Examiner* — Jeffrey Washville
(74) *Attorney, Agent, or Firm* — Clark & Brody

(57) ABSTRACT

Provided is a silver micropowder coated with a protective material and capable of more drastically reducing the sintering temperature than before. The silver micropowder comprises silver particles processed to adsorb hexylamine ($C_6H_{13}$—$NH_2$) on the surfaces thereof and having a mean particle diameter $D_{TEM}$ of from 3 to 20 nm or an X-ray crystal particle diameter $D_X$ of from 1 to 20 nm. The silver micropowder has the property of forming a conductive film having a specific resistivity of not more than 25 µΩ·cm when it is mixed with an organic medium to prepare a silver coating material and when a coating film formed of it is fired in air at 120° C. Even when fired at 100° C., it may form a conductive film having a specific resistivity of not more than 25 µΩ·cm. The silver micropowder can be produced by mixing a silver particle dispersion, as monodispersed in an organic medium, of silver particles coated with a primary amine A having an unsaturated bond and having a molecular weight of from 200 to 400, and hexylamine, and then keeping the mixture at 5 to 80° C. with stirring to thereby form precipitated particles.

6 Claims, 3 Drawing Sheets

(Comparative Example 1)

(51) Int. Cl.
*C09D 11/02* (2014.01)
*B05D 7/14* (2006.01)
*C09D 5/24* (2006.01)
*B22F 1/00* (2006.01)
*B22F 9/24* (2006.01)
*C09C 1/62* (2006.01)
*C09D 11/52* (2014.01)
*B82Y 30/00* (2011.01)

(52) U.S. Cl.
CPC ........... *C01P 2006/40* (2013.01); *B22F 1/0022* (2013.01); *B22F 9/24* (2013.01); *C01P 2004/64* (2013.01); *C09D 11/52* (2013.01); *C01P 2004/04* (2013.01); *C01P 2002/88* (2013.01); *B22F 1/0018* (2013.01); *B82Y 30/00* (2013.01); *B22F 2999/00* (2013.01)
USPC ......... 252/514; 428/403; 106/31.13; 427/216

(56) References Cited

U.S. PATENT DOCUMENTS

2008/0260995 A1\* 10/2008 Hirakoso et al. ............... 428/141
2009/0140336 A1\* 6/2009 Li ................................ 257/347

FOREIGN PATENT DOCUMENTS

| JP | 2006-219693 | 8/2006 |
| JP | 2007-039718 | 2/2007 |
| JP | 2007-046072 | 2/2007 |
| JP | 2007-138250 | 6/2007 |
| WO | 2004/012884 | 2/2004 |

\* cited by examiner (Comparative Example 1)

(Comparative Example 2)

SILVER MICROPOWDER, SILVER INK, SILVER COATING, AND METHODS FOR PRODUCTION OF THESE MATERIALS

TECHNICAL FIELD

The present invention relates to a silver micropowder comprising silver nanoparticles coated with an organic substance, to a silver ink and a silver coating material comprising the silver micropowder, and to a method for producing them. In this description, "nanoparticle" is meant to indicate a particle having a particle diameter of not more than 40 nm or so; and "micropowder" is meant to indicate a powder composed of nanoparticles.

BACKGROUND ART

A metal micropowder has high activity and can be sintered even at low temperatures, and therefore it has been specifically noted as a patterning material for poorly heat-resistant materials for quite some time. In particular, with the recent advancement in nanotechnologies, production of single-nano class particles has become possible relatively in a simplified manner.

Patent Reference 1 discloses a method of mass-producing silver nanoparticles, starting from silver oxide and using an amine compound. Patent Reference 2 discloses a method of producing silver nanoparticles, comprising mixing an amine and a starting material of silver compound, and melting them. Non-Patent Reference 1 describes production of a paste using silver nanoparticles. Patent Reference 4 discloses a technique of producing silver nanoparticles having extremely good dispersibility in liquid. On the other hand, Patent Reference 3 discloses a method of exchanging a protective material for metal nanoparticles, from A to B, which comprises adding a polar solvent where an organic protective material B having a functional group with a high affinity for metal particles, such as a mercapto group or the like is dissolved therein, to a non-polar solvent where metal nanoparticles protected with an organic protective material A exist, then stirring and mixing them.

Patent Reference 1: JP-A 2006-219693
Patent Reference 2: WO04/012884
Patent Reference 3: JP-A 2006-89786
Patent Reference 4: JP-A 2007-39718
Non-Patent Reference 1: Masami Nakamoto, et al., "Application of Silver Nanoparticles to Conductive Pastes", Chemical Industry, by Kagaku Kogyo-Sha, October 2005, pp. 749-754

DISCLOSURE OF THE INVENTION

Problems that the Invention is to Solve

In general, the surfaces of metal micropowder particles are coated with an organic protective material. The protective material plays a role of isolating silver particles from each other in the reaction of producing the particles. Accordingly, it is advantageous to select one having a large molecular weight to some extent. When the molecular weight is small, the distance between the particles may be narrow, and in some case of wet-type synthetic reaction, sintering may go on during the reaction. If so, the particles may grow coarsely and production of a micropowder would be difficult.

On the other hand, when microwiring is formed on a substrate, using a metal micropowder protected with an organic protective material, the metal microparticles must be sintered together after the wiring drawing has been made. During sintering, the organic protective material existing between the particles must be removed through evaporation or the like. A little bit of carbon could be permitted to remain in the sintered body (wiring) in some cases, but may increase electric resistance, and therefore, preferably, it is completely removed.

However, an organic protective material having a large molecular weight is generally difficult to remove through evaporation even by heating, and therefore, for example, in a case of a silver micropowder, a sintered body (wiring) having a high electroconductivity is difficult to construct when it is not exposed to a high temperature of 250° C. or more. Accordingly, the type of the applicable substrate is limited to only some materials having a high heatproof temperature, such as polyimide, glass, aramide, etc.

The present applicant has succeeded in producing silver nanoparticles of extremely good dispersibility by reducing a silver salt in the presence of a primary amine having an unsaturated bond such as oleylamine or the like, using the method shown in Patent Reference 4 or other methods developed thereafter. The silver particles produced according to such methods are coated with the organic protective material of primary amine that was made to exist in the reduction system. The organic protective material has a relatively large molecular weight of 200 or more, and adheres to the circumference of the metal silver, therefore playing a role of a so-called "floating tube (or floating bag)", and this contributes toward excellent dispersibility in a liquid organic medium. Though the organic protective material has a relatively large molecular weight, it exhibits an effect of facilitating the sintering of metal silver particles in the thin film drawn with the ink or the coating material that contains the silver particles. This may be because of the following reasons: The organic protective material has an unsaturated bond in the molecule, and therefore the organic protective material itself may be readily oxidized and decomposed during firing and may be thereby relatively readily released from metal silver particles. In a case of using oleylamine, a conductive material can be formed even in low-temperature firing at 180° C. or so.

However, even though the firing temperature could be lowered to 180° C. or so, the limitation to substrates is still significant. If a metal micropowder capable of being sintered at a low temperature of from 100 to 180° C., preferably from 100 to 150° C. or so could be produced in a simplified method, its use could inevitably broaden greatly. For example, when a transparent polycarbonate is used as a substrate, microwiring could be directly drawn on the surfaces of media such as CD, DVD and the like, as well as lenses, and various functions may be imparted thereto. Inexpensive antennas with microwiring drawn on a PET (polyethylene terephthalate) substrate, and IC tags using paper as the base material thereof could be realized. Further, a metal wire may be drawn directly on a conductive polymer, and expansion of the applicability of various electrode materials and others is expected. In case where silver is used as a metal micropowder, its antibacterial effect can be utilized, and other innumerable applications may be taken into consideration.

Patent Reference 3 discloses a technique of replacing a protective material that covers the surfaces of metal particles, with any other protective material. In the step of producing metal nanoparticles according to this technique, a reducing agent is, later on, dropwise added to a solvent that contains a metal donor substance and a protective material dissolved therein to thereby obtain metal particles coated with the protective material. In the case of reaction with dropwise addition of a reducing agent to a solvent, the reducing agent itself is diluted with the solvent, and therefore in the case, a strong reducing agent must be used, and it is not easy to deposit metal nanoparticles with a completely uniform reducing power even though the liquid is stirred. In addition, the ingredient of the reducing agent would easily penetrate into the particles. Accordingly, quality management control is difficult for attaining a uniform particle size distribution and for reducing the impurities in the metal particles. Patent Reference 3 shows a case of using, in the invention therein, an organic compound having a small molecular weight of around 100, such as naphthenic acid, octylamine or the like, as the protective material in forming the particles, but not showing any other concrete method of producing metal nanoparticles protected with an organic compound larger than it. The metal nanoparticles for which the molecular weight of the protective material is small as above may readily flocculate and precipitate out in a liquid medium. In fact, in the invention of Patent Reference 3, it is said that a step of precipitating and collecting aggregates of metal nanoparticles is indispensable in the production stage. It is considered that such readily flocculating and precipitating particles will be difficult to keep dispersed in a liquid medium, and a lot of time may be taken in handling them in the intermediate step including washing, and in the step of exchanging the protective material, strongly stirring and mixing them will be indispensable for maintaining uniform quality. To that effect, the technique of Patent Reference 3 requires further improvements in point of the difficulty in uniform reduction control and the flocculating and precipitating property (poor dispersibility) of the particles, for practically carrying out it on an industrial scale.

The present invention is to provide a silver micropowder coated with a protective material capable of more drastically lowering the sintering temperature than before according to a simplified method, and to provide a silver ink and a silver, coating material comprising it.

Means for Solving the Problems

For attaining the above-mentioned object, the present invention provides a silver micropowder of silver particles processed to adsorb hexylamine ($C_6H_{13}$—$NH_2$) on the surfaces thereof and having a mean particle diameter $D_{TEM}$ of from 3 to 20 nm or an X-ray crystal particle diameter $D_X$ of from 1 to 20 nm. The invention also provides a silver ink produced by dispersing the silver micropowder in a liquid organic medium S. The liquid organic medium S is preferably an aromatic hydrocarbon, including, for example, decalin ($C_{10}H_{18}$). Further the invention provides a silver coating material prepared by mixing the silver micropowder with an organic medium. The silver coating material has the property of forming a conductive film having a specific resistivity of not more than 25 $\mu\Omega$·cm when a coating film thereof is fired at 120° C. in air. Even when fired at 100° C., it gives a conductive film having a specific resistivity of not more than 25 $\mu\Omega$·cm.

For the method of producing the silver micropowder having excellent low-temperature sinterability, the present invention provides a production method that comprises a step of mixing a silver particle dispersion, as monodispersed in an organic medium, of silver particles coated with a primary amine A having an unsaturated bond and having a molecular weight of from 200 to 400, and having a mean particle diameter $D_{TEM}$ of from 3 to 20 nm or an X-ray crystal particle diameter $D_X$ of from 1 to 20 nm, and hexylamine (mixing step), a step of keeping the mixture liquid at 5 to 80° C. with stirring to thereby form precipitated particles (precipitation step), and a step of collecting the precipitated particles as a solid fraction through solid-liquid separation (solid-liquid separation step). The collected solid fraction is composed of the low-temperature sinterable silver micropowder. "Precipitated particles" as referred to herein are particles that precipitate when stirring the liquid is stopped; and during the precipitation step, many precipitating particles are kept floating in the liquid since the liquid is stirred. As the primary amine A, preferred is oleylamine ($C_9H_{18}$=$C_9H_{17}$—$NH_2$), having a molecular weight of about 267).

The silver ink of the invention may be produced according to a method comprising a step of washing the solid fraction (silver micropowder) collected in the manner as above (washing step), and a step of dispersing the washed solid fraction in a liquid organic medium S (ink-forming step). Further, the low-temperature sinterable silver coating material of the invention may be produced according to a method comprising a step of washing the solid fraction (silver micropowder) collected in the manner as above (washing step), and a step of mixing the washed solid fraction with an organic medium to make the mixture have a coatable property (coating material forming step).

The method of firing the silver coating film in air at 120° C. or 100° C. and measuring the specific resistivity of the fired film is not specifically defined, for which preferably employed is an ordinary method in the art. In this, the condition under which a sample to be analyzed is fired in air at 200° C. and the fired film is evaluated to have a specific resistivity of not more than 20 $\mu\Omega$·cm is applied to 120° C. firing or 100° C. firing, and the conductivity of the 120° C.-fired film or the 100° C.-fired film is evaluated. In other words, the condition in preparing, applying for coating, firing and analyzing the coating material is made the same as the condition under which the 200° C. firing could give a specific resistivity of not more than 20 $\mu\Omega$·cm (provided that only the firing temperature is changed to 120° C. or 100° C.), and the specific resistivity of the 120° C.-fired film or the 100° C.-fired film is measured. Any firing method whatever be capable of confirming the sintering result by firing at 200° C. (known ordinary method) could confirm the presence or absence of the sintering result even when applied to firing at 120° C. or to firing at 100° C. Such a silver micropowder or a silver coating for which originally the condition for forming a fired film having a specific resistivity of not more than 20 $\mu\Omega$·cm could not be found out in firing at 200° C. in air is outside the scope to which the invention is directed.

In this description, "processed to adsorb hexylamine on the surfaces" means that the surfaces of metal silver particles are coated with a protective material formed by adsorbing hexylamine molecules on the surfaces thereof, and the individual metal silver particles are kept independent of each other, not bonding to each other. So far as the silver micropowder composed of such silver nanoparticles could have the property of forming a conductive film having a specific resistivity of not more than 25 $\mu\Omega$·cm when fired in air at 120° C. as in the above, it may contain any other organic substance (for example, the amine A ingredient and the like such as oleylamine, etc.) as impurities.

Advantage of the Invention

The invention has realized a silver micropowder capable of being sintered at a low firing temperature of 120° C., and a silver ink and a silver coating material that comprises it. In particular, even in a case where the firing temperature is lowered to 100° C. or so, sintering failure hardly occurs, and therefore the latitude in firing temperature control is broadened more than before. Further, the silver micropowder, the silver ink and the silver coating material of the invention can be produced relatively in a simplified manner, and it may be fully possible to industrialize them.

BEST MODE FOR CARRYING OUT THE INVENTION

Figure 1:
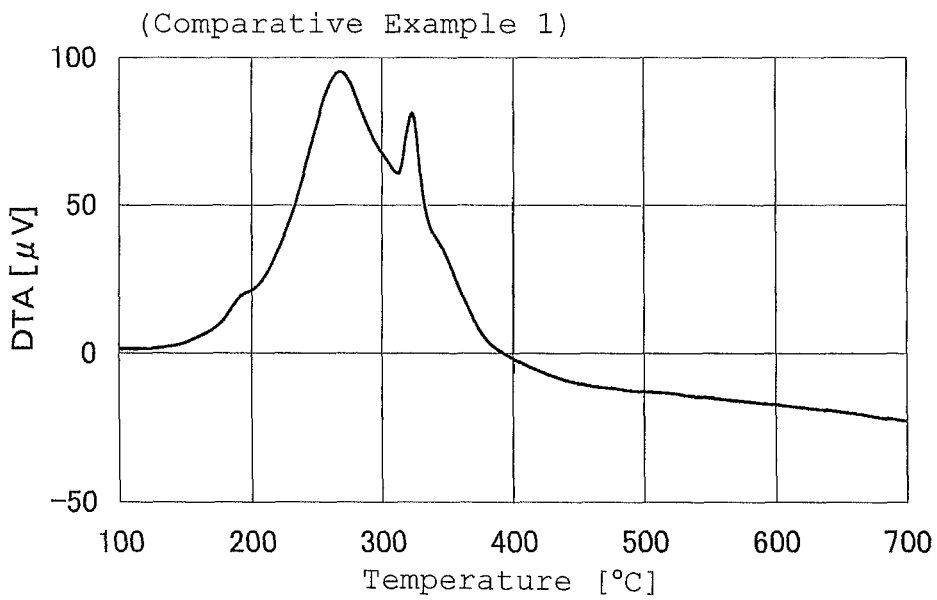
FIG. 1 This is a DTA curve relating to the protective material of the particles used in the silver coating material in Comparative Example 1.

The silver micropowder excellent in low-temperature sinterability of the invention is characterized in that its constituent, silver particles are coated with an organic protective material of hexylamine adsorbed on the surfaces thereof.

In general, an organic compound having a function of a surfactant has a structure of R—X where R is a hydrophobic group and X is a hydrophilic group. The hydrophobic group R is typically an alkyl group with hydrogen bonding to the carbon skeleton. The hydrophilic group X includes various groups; in fatty acids, it is "—COOH", and in amines, it is "—$NH_2$". Such a surfactant can be utilized as an organic protective material that protects the active outermost surface of metal silver particles. In this case, it is considered that the hydrophilic group X may bond to the surface of the metal silver while the hydrophobic group R may be so aligned as to face outward of the particle coated with the organic protective material. Metal nanoparticles are extremely highly active, and therefore, in general, they could not exist stably when their surfaces are not covered with a protective material. However, in order that the thin film formed of a coating material of silver nanoparticles is made to be conductive, the metal silver particles must be sintered together at a temperature as low as possible, and for this, the metal silver particles must be extremely thin, for example, having $D_{TEM}$ of not more than 20 nm, and in addition, the protective material on the surfaces of the particles must be readily released away from the surfaces of the particles through evaporation removal in low-temperature firing.

For facilitating the removal and evaporation from the particles in low-temperature firing, it is advantageous to use an organic compound having a molecular weight as small as possible of all having the same hydrophilic group, as the protective material. On the other hand, those having nearly the same molecular weight may differ in the removability and the evaporability depending on the structure of the hydrophilic group X. The inventors' investigations have clarified that, in comparison between fatty acids and amines, amines are more advantageous in low-temperature sintering. If silver metal nanoparticles coated with an amine having a small molecular weight on the surfaces thereof could be obtained, then an ink and a coating material (paste) excellent in low-temperature sinterability could be produced.

However, in case where silver nanoparticles are produced according to a "wet process" that is advantageous for mass-production as compared with production in a vapor phase, and when silver particles coated with an amine having a low molecular weight are directly produced in that case, it is difficult to obtain a silver micropowder having good dispersibility owing to flocculation or the like, therefore often bringing about a bar to the operation in preparing a coating material via a step of washing or the like after the synthetic reaction. Therefore, in the invention, silver nanoparticles having good dispersibility that are coated with an amine A having a molecular weight of from 200 to 400 are previously prepared, and thereafter the amine A is replaced with an amine B having a low molecular weight, thereby producing silver nanoparticles coated with the organic protective material of amine B.

As the amine B, hexylamine ($C_6H_{13}$—$NH_2$, having a molecular weight of 101.2) is used in the invention. As indicated by the data given hereunder, the silver nanoparticles processed to adsorb a primary amine having 8 carbon atoms, octylamine ($C_8H_{17}$—$NH_2$) have the property of being well sintered at a firing temperature of 120° C.; however, at 100° C. or so, the resistance of the conductive film tends to suddenly increase. Accordingly, for example, in case where the low firing temperature condition at 120° C. is employed, the desired conductive film is difficult to stably obtain unless the temperature control is taken severely. As opposed to this, when a primary amine having 6 carbon atoms, hexylamine is adsorbed, it has been confirmed that the sintering could fully be effected even at 100° C. Specifically, since the protective material is composed of hexylamine having a low molecular weight, the protective material could readily be released away even in low-temperature firing at around 100° C. or so. Accordingly, the latitude in the firing temperature condition can be drastically broadened.

As the amine A, herein employed is a primary amine having an unsaturated double bond and a molecular weight of from 200 to 400. The primary amine of the type is favorable as the protective material in production of silver particles in a wet process. The amine has a week coordination force to the surfaces of silver particles and is relatively readily desorbed from the silver particle surface, and therefore can be readily replaced with hexylamine. However, amines having a too large molecular weight could not be smoothly desorbed, and those having a molecular weight of not more than 400 are preferred herein. Owing to the unsaturated bond existing therein, the amine can be liquid at around room temperature though having a somewhat large molecular weight of from 200 to 400, and therefore does not require heating in the subsequent precipitation step and solid-liquid separation step; and this is another advantageous feature of the invention in industrialization thereof. In particular, for the low-temperature sinterable particles of the invention, in-process heating would cause sintering of the particles to each other and would be therefore a bar to production of high-quality coating material and ink. In the past investigations, oleylamine is extremely favorable, as combined with the easiness in production of silver particles.

The particle size of the silver particles coated with the organic protective material can be expressed by the mean particle diameter $D_{TEM}$ thereof to be measured on the TEM (transmission electronic microscope) image, or by the X-ray crystal particle diameter $D_X$ thereof. In the invention, silver particles having $D_{TEM}$ of from 3 to 20 nm, or silver particles having an X-ray crystal particle diameter $D_X$ of from 1 to 20 nm are preferred candidates. The silver micropowder falling within the particle diameter range is advantageous in producing inks and coatings having good properties. Of those, silver particles having a particle size, $D_{TEM}$ of from 6 to 20 nm or $D_X$ of from 4 to 20 nm are readily produced according to the method mentioned below. Extremely fine silver particles having $D_{TEM}$ of from 3 to 7 nm or $D_X$ of from 1 to 5 nm or so can be produced, for example, according to a method of directly reducing a silver compound in a solvent of oleylamine. The crystal grain boundaries of the thus-produced metal silver may be often contaminated with impurities; and when the amount of the impurities increases, it may bring about some disadvantages in that pores may be formed in firing the microwiring and the microwiring could not secure good conductivity and may have poor migration-proofness. As a result of various investigations, preferred are silver particles having a degree of monocrystallinity, $D_{TEM}/D_X$ of not more than 2.5, more preferably not more than 2.0.

The silver particles coated with a protective material hexylamine could readily precipitate in a liquid medium, as compared with those coated with an organic protective material having a large molecular weight; but as a result of various investigations, it has been found that "a silver ink" capable of exhibiting good dispersibility can be produced when a suitable liquid organic medium S is used. The liquid organic medium S is preferably an aromatic hydrocarbon. For example, it has been confirmed that the particles can be well dispersed in cyclohexane, toluene, cumene, diethylbenzene, tetralin, decalin, etc. It has been confirmed that the silver ink prepared by dispersing the silver particles with a protective material hexylamine in decalin ($C_{10}H_{18}$) can form a conductive coating film that is sinterable at 100° C.

The silver micropowder excellent in low-temperature sinterability can be produced in the manner mentioned below.

[Production of Silver Particles]

It is important that the starting silver nanoparticles for use in the invention are stable in the particle properties such as the particle size distribution and others and have the property of hardly flocculating and precipitating in a liquid medium. As the production method for such silver particles, herein described in brief is the production method disclosed in Patent Reference 4. Specifically, the production method comprises reducing a silver compound with a reducing agent of an alcohol or a polyol, in an alcohol or a polyol, to thereby deposit silver particles. In this case, the alcohol or the polyol is a solvent and is also a reducing agent. The reduction may be attained by heating the solvent liquid preferably up to a state of reflux. According to the method, contamination with impurities may be prevented and, for example, when the silver particles are used as a wiring material, the resistance of the resulting wiring may be reduced.

In promoting the reduction, it is essential to make an organic compound functioning as a protective material exist in the solvent. As the organic compound, herein used is the primary amine A having an unsaturated bond. With an amine not having an unsaturated bond, it may be difficult to produce silver nanoparticles protected with the amine on the surfaces thereof. Regarding the number of the unsaturated bond in the amine A, the inventors' findings have confirmed that one double bond will do therein. However, the amine A for use herein shall have a molecular weight of from 200 to 400. With an amine having a small molecular weight, the silver particles may readily flocculate and precipitate in the liquid medium during reduction, therefore often detracting from uniform reduction. If so, the quality management control for a uniform particle size distribution would be difficult. In addition, it would also be difficult to produce a monodispersed state of silver particles in the liquid organic medium. On the contrary, when an organic compound having a too large molecular weight is used, it may be difficult to attain the operation of substituting the compound with hexylamine in the later step. A concrete example of the amine A is oleylamine.

The amount of the primary amine A to be in the solvent in reduction may be from 0.1 to 20 equivalents to silver, more preferably from 1.0 to 15 equivalents, even more preferably from 2.0 to 10 equivalents. In this, one mol of the primary amine corresponds to one equivalent thereof to one mol of silver. When the amount of the primary amine to be used is too small, then the amount of the protective material on the surfaces of the silver particles may be insufficient, and the particles could not be monodispersed in the liquid. If too large, the reaction of substituting the amine A with hexylamine in the later step could not be efficiently attained.

As the reducing agent, used is the solvent, alcohol or polyol. Efficiently, the reaction is attained under reflux. For this, the boiling point of the alcohol or the polyol is preferably lower, and is concretely from 80 to 300° C., preferably from 80 to 200° C., more preferably from 80 to 150° C. Various compounds disclosed in Patent Reference 4 and others may be used; and above all, preferred are isobutanol and n-butanol.

For promoting the reduction, a reduction promoter may be added. As the reduction promoter, one or more disclosed in Patent Reference 4 may be selected; and of those, especially preferred is use of diethanolamine or triethanolamine.

The silver compound as the silver source may be any one capable of dissolving in the above-mentioned solvent, including silver chloride, silver nitrate, silver oxide, silver carbonate, etc. From the industrial viewpoint, preferred is silver nitrate. The Ag ion concentration in the liquid in reduction may be not less than 0.05 mol/L, preferably from 0.05 to 5.0 mol/L. The molar ratio of amine A/Ag may be within a range of from 0.05 to 5.0. The molar ratio of the reduction promoter/Ag may be within a range of from 0.1 to 20.

Preferably, the temperature in reduction is within a range of from 50 to 200° C. More preferably, it is from 50 to 150° C., even more preferably from 60 to 140° C. Preferably, in the silver particles coated with an amine A (produced through the above reduction), the proportion of the amine A to the total of the silver particles and the amine A (hereinafter this may be referred to as "amine A ratio") is controlled to be from 0.05 to 25% by mass. When the amine A ratio is too low, the particles may readily flocculate. On the contrary, when the amine A ratio is high, there may be a risk that the substitution of the amine A with the amine B in the later step could not be attained efficiently.

[Preparation of Silver Particle Dispersion]

The silver particles coated with an amine A are, after produced through reduction, for example, according to the above-mentioned wet process, collected through solid-liquid separation and then washed. Afterwards, these are mixed with a liquid organic medium to be a dispersion. As the liquid organic medium, a substance is selected in which the silver particles coated with an amine A can well disperse. For example, preferably used are hydrocarbons. For example, usable are aliphatic hydrocarbons such as hexane, heptane, octane, nonane, decane, undecane, dodecane, tridecane, tetradecane, etc. Also usable is a petroleum solvent such as kerosene, etc. One or more of these substances may be used to prepare a liquid organic medium.

In the invention, however, it is important to prepare a silver particle dispersion where silver particles coated with an amine A are monodispersed therein. "Monodispersed" as referred to herein means that the individual silver particles exist in the liquid medium in an independently movable state therein, but not aggregating together. Concretely, when the liquid that contains the silver particles is centrifuged for solid-liquid separation, the liquid (supernatant) in which the particles are kept still dispersed therein is employed as the silver particle dispersion herein.

[Exchange of Protective Material]

Mixing the liquid organic medium in which the silver particles coated with an amine A are monodispersed with hexylamine realizes a state where hexylamine exists around the individual particles, or that is, a state where the particles are surrounded by the molecules of hexylamine in the liquid (hereinafter this is referred to as "hexylamine-surrounded state"). The inventors have found that, when this state is kept for a while, then there occurs a phenomenon that the amine A is released from the silver particles and is substituted with hexylamine (hereinafter this may be referred to as "substitution reaction").

At present, most of the mechanism of bringing about the substitution reaction are not clear, but it may be considered that the difference in the affinity between metal silver and amine to be caused by the difference in the size of the hydrophobic group between the amine A and hexylamine would be the main factor for promotion of the reaction. In addition, it is considered that the use of the amine A having an unsaturated bond would facilitate the release of the amine A from the silver metal, therefore contributing toward the promotion of the substitution reaction thereof with hexylamine.

The substitution reaction may go on at around 5° C. or higher; however, when the reaction is held at a low liquid temperature, a part of the amine A would remain as kept adsorbed on the surface of the metal silver. Specifically, the protective material to be formed may contain a large quantity of the impurity amine A in hexylamine. In this case, the dispersibility in an aromatic organic compound may be low, and the silver micropowder would be disadvantageous in producing an inexpensive liquid ink that comprises an aromatic organic compound as the dispersion medium. Accordingly, the exchange to hexylamine is held preferably at 20° C. or higher, more preferably at 50° C. or higher. However, at a too high temperature, some unconsidered sintering may occur; and therefore, the reaction is held preferably at a temperature not higher than 80° C., more preferably at a temperature not higher than 70° C.

With the promotion of the substitution reaction of the protective material covering the surfaces of the silver particles with hexylamine having a low molecular weight, the effect of "floating tube" of the amine A having a large molecular weight may gradually reduce, and even in the state where the amine A still remains, the particles begin to precipitate down. When the precipitated particles are deposited at the bottom of the reactor, the particles could no more get the "hexylamine-surrounded state", and the substitution reaction hardly goes on further. Accordingly, in the invention, the liquid is stirred during the substitution reaction. However, it is not necessary to stir the liquid so strongly. It may be enough so far as the particles with the amine A still adhering thereto could be exposed to the "hexylamine-surrounded state". Accordingly, it is desirable that the stirring force is given to such a degree that the precipitated particles would not be deposited at the bottom of the reactor.

After the formation of the "hexylamine-surrounded state", the substitution with hexylamine increases with time; but the substitution reaction is preferred to continue for 1 hour or more. However, even over 24 hours, the substitution reaction may not go on any more, and therefore, from the practical viewpoint, the substitution reaction is finished within 24 hours. The reality is that the time is controlled within 1 to 7 hours.

The amount of hexylamine to be mixed is one enough for realizing the "hexylamine-surrounded state". Relative to the amount of the amine A existing as the protective material before mixing, the amount of hexylamine is preferably a considerably large amount in terms of the ratio thereof by mol. Concretely, in terms of the equivalent ratio to Ag existing as silver particles before mixing (hexylamine/Ag), hexylamine is mixed preferably in an amount of not less than 1 equivalent, though depending on the liquid amount. In the past experiments, good results were obtained with from 2 to 20 equivalents or so of hexylamine in terms of the equivalent ratio of hexylamine/Ag. One mol of hexylamine corresponds to one equivalent, relative to one mol of Ag.

When an alcohol in which the amine A can well dissolve is incorporated in the liquid where the substitution reaction goes on, then the substitution with hexylamine may go on more efficiently. In case where the amine A is oleylamine, for example, isopropanol is favorably added to the liquid.

[Solid-Liquid Separation]

As described in the above, the particles on which the substitution reaction has finished precipitate down, and therefore, the liquid after the reaction is subjected to solid-liquid separation whereby the particles processed for the substitution reaction (in the precipitation step) can be collected as a solid fraction. For the solid-liquid separation, preferred is centrifugation. The obtained solid fraction comprises mainly silver nanoparticles coated with an organic protective film of hexylamine. In that manner, the silver micropowder of the invention can be obtained.

[Washing]

Preferably, the above-mentioned solid fraction is washed with a solvent such as alcohol, etc. After the washing operation to be held once or more, the solid fraction finally obtained through solid-liquid separation is used in the coating.

[Preparation of Ink]

The above-mentioned, washed solid fraction (silver micropowder with the protective material substituted with hexylamine) is mixed with a suitable liquid organic medium S whereby the silver micropowder is dispersed in the liquid organic medium S to give a silver ink of the invention. Since hexylamine has a low molecular weight, its ability as a "floating ring" is naturally low; however, use of the suitable liquid organic medium S can realize a good dispersion state. As the liquid organic medium S, aromatic hydrocarbons are relatively effective, and one preferred example is decalin.

[Preparation of Coating Material]

The above-mentioned, washed solid fraction (silver micropowder with the protective material substituted with hexylamine) is mixed with a suitable organic medium thereby to make the mixture have coatability; and a silver coating material of the invention is thus produced. The organic medium to be mixed here is essentially so selected that it may be readily evaporated away at a temperature of 120° C. or so.

EXAMPLES

Comparative Example 1

As a reference, a silver coating material was prepared, using a silver micropowder produced according to the alcohol reduction method disclosed in Patent Reference 4 or the like, and this was fired at a firing temperature of 200° C. or 120° C., and the specific resistivity of the fired film was measured. In this silver micropowder, the surfaces of the individual particles are coated with an amine A (here, this is oleylamine). Concretely, the experiment is as follows:

[Production of Silver Particles]

96.24 g of isobutanol (special grade chemical by Wako Pure Chemical Industries) as a reaction medium and a reducing agent, 165.5 g of oleylamine (by Wako Pure Chemical Industries, having a molecular weight of 267) as an amine A, and 20.59 g of silver nitrate crystal (by Kanto Chemical) as a silver compound were prepared, and these were mixed and stirred with a magnet stirrer to dissolve the silver nitrate. The solution was transferred into a container equipped with a reflux condenser, put in an oil bath, and with introducing, as an inert gas, nitrogen gas at a flow rate of 400 mL/min into the container, the solution was heated up to 108° C. with stirring with the magnet stirrer. This was kept refluxed for 5 hours at a temperature of 108° C., and then 12.87 g of a secondary amine, diethanolamine (by Wako Pure Chemical Industries, having a molecular weight of 106) as a reduction promoter was added thereto in a ratio by mol to Ag of 1.0. Next, this was kept as such for 1 hour, and the reaction was thus finished. After the reaction, the slurry was centrifuged for solid-liquid separation, the separated liquid was discarded, and the solid component was collected. Next, this was washed twice according to an operation of "mixing the solid component and methanol, then centrifuging the mixture for solid-liquid separation, discarding the separated liquid and collecting the solid component".

[Preparation of Silver Particle Dispersion]

Tetradecane was prepared as a liquid organic medium. This was mixed with the above-mentioned, washed solid component, then dispersed and centrifuged for 30 minutes for solid-liquid separation, and the separated liquid was collected. In this liquid, the amine A (oleylamine)-coated silver particles are monodispersed.

The silver particle dispersion was observed with a transmission electronic microscope (TEM), and the mean particle diameter $D_{TEM}$ was determined. Specifically, of the particles observed with a 600,000-power TEM (JEOL's JEM-2010), independent, non-overlapping 300 silver particles were analyzed for the particle diameter thereof, and the data were averaged to compute the mean particle diameter. As a result, $D_{TEM}$ was 8.5 nm. In this Example, the silver particle dispersion is used for a silver coating material as described below; and in Table 1, the value of $D_{TEM}$ is shown.

The coating amount of the amine A (oleylamine) on the silver particles in the silver particle dispersion was measured according to the method disclosed in Japanese Patent Application No. 2007-235015, and was 8.0% by mass.

[TG-DTA of Protective Material]

The washed solid fraction (in wet) obtained according to the above-mentioned "Production of Silver Particles" was analyzed through TG-DTA at a heating speed of 10° C./rain. The DTA curve is shown in FIG. 1. In FIG. 1, the large mountain appearing between 200 and 300° C. and the peak appearing between 300 and 330° C. are considered to be derived from the amine A, oleylamine.

[Determination of X-ray Crystal Particle Diameter $D_X$]

The washed solid fraction (in wet) obtained according to the above-mentioned "production of silver particles" was applied onto a glass cell, set in an X-ray diffractometer, and based on the diffraction peak of the Ag(111) plane, the X-ray crystal particle diameter $D_X$ was computed according to the Scherrer's formula of the following formula (I). For the X-ray, used was Cu—Kα.

$$D_X = K \cdot \lambda / (\beta \cdot \cos \theta) \tag{1}$$

In this, K is the Scherrer's constant, and is 0.94. λ is the X-ray wavelength of the Cu—Kα ray; β is the half-value width of the above-mentioned diffraction peak; and θ is the Bragg angle of the diffraction line.

The results are shown in Table 1 (the same shall apply to Examples given below).

[Preparation of Silver Coating Material]

In this, a silver coating material was prepared, using silver particles coated with a protective material of the amine A. The viscosity of the silver coating dispersion was measured with a rotary viscometer (Toki Sangyo's RE550L), and the viscosity was 5.8 mPa·s. The silver concentration in the silver particle dispersion was measured with a TG-DTA device, and was 60% by mass. It was recognized that the silver particle dispersion could have coatability as an ink, and therefore, it was used as a silver coating material directly as it was.

[Formation of Coating Film]

The above-mentioned silver coating material was applied onto a glass substrate according to a spin coating method, thereby forming a coating film thereon.

[Formation of Fired Film]

The substrate on which the coating film was formed was first pre-fired on a hot plate at 60° C. for 30 minutes, and then this was left on the hot plate and kept thereon at 200° C. in air for 1 hour, thereby giving "200° C.-fired film". Similarly, after pre-fired at 60° C., the coated substrate was kept on the hot plate at 120° C. for 1 hour, thereby giving "120° C.-fired film".

[Measurement of Specific Resistivity (Volume Resistivity) of Fired Film]

From the surface resistivity measured with a surface resistivity meter (Mitsubishi Chemical's Loresta HP), and the thickness of the fired film measured with a fluorescent X-ray film thickness meter (SII's STF9200), the volume resistivity was computed, and this was taken as the specific resistivity of the fired film.

The results are shown in Table 1 (the same shall apply to Examples given below).

As is known from Table 1, the specific resistivity of the 200° C. fired film formed of the silver micropowder of this Example where the constitution of the protective material is the amine A greatly lowered, and it may be said that silver was sintered at a temperature not higher than 200° C. However, the 120° C. fired film could not be admitted to have conductivity. Accordingly, it may be said that under the condition of 120° C.×1 hour, the silver particles could not be sintered enough to impart conductivity to the sintered film.

Comparative Example 2

Silver nanoparticles were produced according to "Production of Silver Nanoparticles" described in Comparative Example 1, and a silver particle dispersion of the silver particles coated with amine A (oleylamine) monodispersed in tetradecane was produced. As the substituting amine B, octylamine was used in Comparative Example 2.

[Formation of Octylamine-Substituted Particles]

107.8 g of a reagent octylamine ($C_8H_{17}$—$NH_2$, special grade chemical by Wako Pure Chemical Industries) was prepared. The amount corresponds to 10.0 equivalents relative to Ag. For the purpose of promoting the reaction, 100.3 g of isopropyl alcohol (special grade chemical by Wako Pure Chemical Industries) was prepared. Octylamine and isopropyl alcohol were mixed in a glass vessel. Next, the mixture of octylamine and isopropyl alcohol was added to 18.0 g of the silver particle dispersion obtained according to the method of Comparative Example 1 (in which the amine A coating amount was 8.0% by mass, and the silver concentration was about 50% by mass). Next, the reactor was heated in a water bath up to a liquid temperature of 60° C., and with heating and stirring at 400 rpm, the substitution reaction was continued for 5 hours. When the stirring was stopped, the formation of precipitated particles was confirmed.

[Solid-Liquid Separation and Washing]

452.1 g of methanol (corresponding to 2 times by mass of the reaction liquid) was added to the above reaction liquid.

This was added for promoting the precipitation. The liquid was centrifuged for 5 minutes for solid-liquid separation. The separated solid fraction was collected, 80.1 g of methanol was added to the solid fraction, and stirred at 400 rpm for 30 minutes, and then centrifuged for 5 minutes for solid-liquid separation, and the solid fraction was collected.

[TG-DTA of Protective Material]

Figure 2:
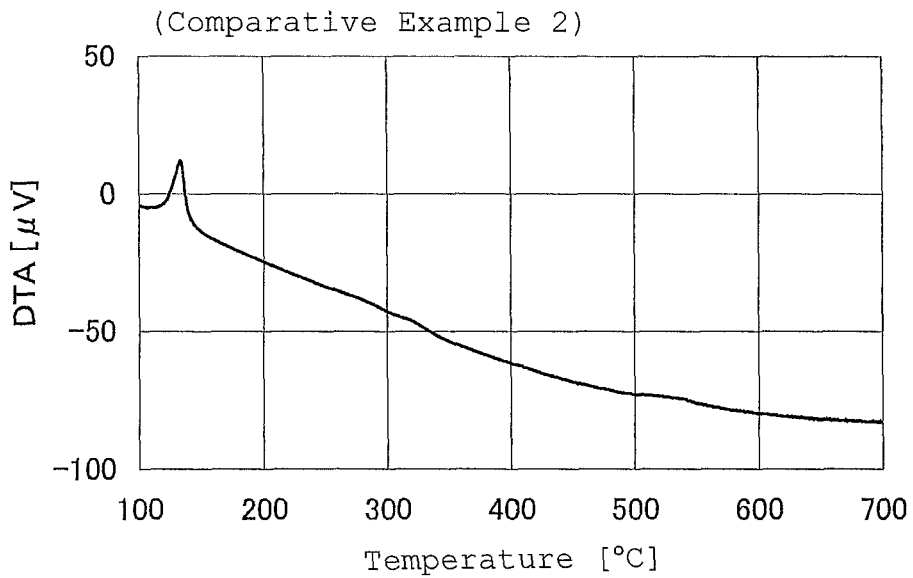
FIG. 2 This is a DTA curve relating to the protective material of the particles used in the silver coating material in Comparative Example 2.

The washed solid fraction was analyzed through TG-DTA in the same manner as in Comparative Example 1. The DTA curve is shown in FIG. 2. By comparison between before substitution (FIG. 1) and after substitution (FIG. 2), the peak appearing in FIG. 1 disappeared after substitution, and a new peak was seen. From this, it is considered that the protective material was changed from the amine A (oleylamine) to octylamine.

[Determination of Mean Particle Diameter $D_{TEM}$]

The sample powder (octylamine protective material-coated, washed solid fraction in wet) was observed with TEM (JEOL's JEM-2010). Of the particles on the image, independent, non-overlapping 300 silver particles were randomly selected and analyzed for the particle size thereof (major diameter on the image). The data were arithmetically averaged to give the mean particle diameter $D_{TEM}$ of the particles.

[Determination of X-ray Crystal Particle Diameter $D_X$]

The sample powder (octylamine protective material-coated, washed solid fraction in wet) was applied onto a glass cell, set in an X-ray diffractiometer, and the X-ray crystal particle diameter $D_X$ was determined under the same condition as in Comparative Example 1.

[Preparation of Silver Coating Material]

A small amount of decalin was added to the above-mentioned, washed solid fraction and processed with a kneading defoamer to prepare a 50 mas. % silver coating material.

[Formation of Coating Film]

Using an applicator, the silver coating material was applied onto the same substrate as in Comparative Example 1, thereby forming a coating film thereon.

[Formation of Fired Film]

This was attained according to the same method as in Comparative Example 1.

[Measurement of Specific Resistivity (Volume Resistivity) of Fired Film]

This was attained according to the same method as in Comparative Example 1. However, the film fired at a firing temperature of 100° C. was also analyzed.

Example 1

Silver nanoparticles were produced according to "Production of Silver Nanoparticles" described in Comparative Example 1, and a silver particle dispersion of the silver particles coated with amine A (oleylamine) monodispersed in tetradecane was produced. As the substituting amine B, hexylamine was used in Example 1. In this, for confirming the reproducibility, the same experiments made under the condition mentioned below were repeated 7 times (n=1 to 7), and the data are shown in Table 1 below.

[Formation of Hexylamine-Substituted Particles]

As the amine B, 84.4 g of a reagent hexylamine ($C_6H_{13}$—$NH_2$, special grade chemical by Wako Pure Chemical Industries) was prepared. The amount corresponds to 10.0 equivalents relative to Ag. For the purpose of promoting the reaction, 100.3 g of isopropyl alcohol (special grade chemical by Wako Pure Chemical Industries) was prepared. Hexylamine and isopropyl alcohol were mixed. Next, the mixture of hexylamine and isopropyl alcohol was added to 18.0 g of the silver particle dispersion obtained according to the method of Comparative Example 1 (in which the amine A coating amount was 8.0% by mass, and the silver concentration was about 50% by mass). Next, the reactor was heated in a water bath up to a liquid temperature of 60° C., and with heating and stirring at 400 rpm, the substitution reaction was continued for 5 hours. When the stirring was stopped, the formation of precipitated particles was confirmed.

[Solid-Liquid Separation and Washing]

405.3 g of methanol (corresponding to 2 times by mass of the reaction liquid) was added to the above reaction liquid. This was added for promoting the precipitation. The liquid was centrifuged for 5 minutes for solid-liquid separation. The separated solid fraction was collected, 80.1 g of methanol was added to the solid fraction, and ultrasonically dispersed for 30 minutes, and then centrifuged for 5 minutes for solid-liquid separation, and the solid fraction was collected.

[TG-DTA of Protective Material]

Figure 3:
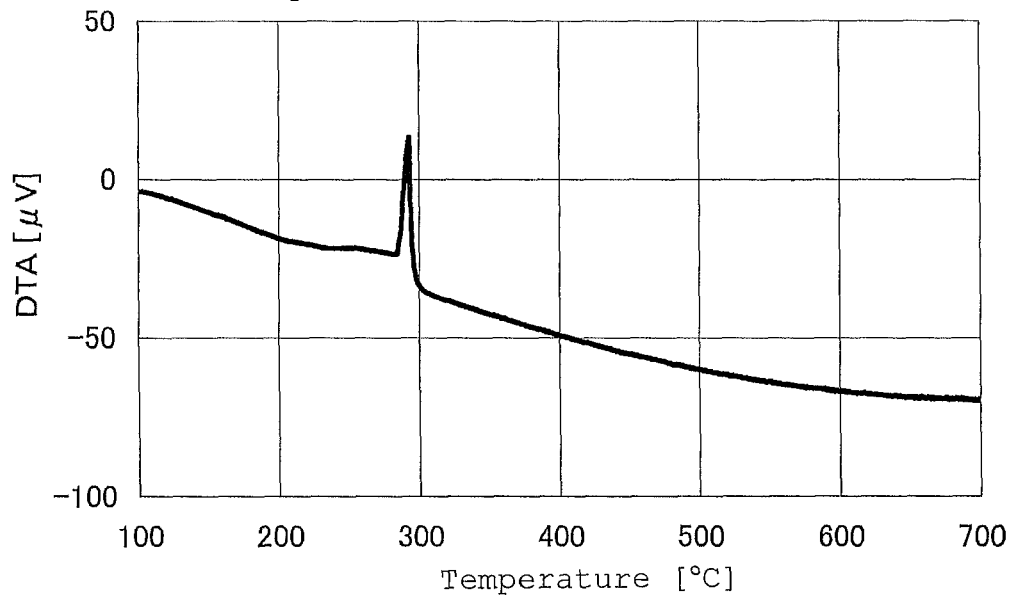
FIG. 3 This is a DTA curve relating to the protective material of the particles used in the silver coating material of the case n=6 in Example 1.

The washed solid fraction was analyzed through TG-DTA in the same manner as in Comparative Example 1. One typical DTA curve (case of n=6) is shown in FIG. 3. By comparison between before substitution (FIG. 1) and after substitution (FIG. 3), the peak appearing in FIG. 1 disappeared after substitution, and a new peak was seen. From this, it is considered that the protective material was changed from the amine A (oleylamine) to hexylamine.

[Determination of Mean Particle Diameter $D_{TEM}$]

The sample powder (hexylamine protective material-coated, washed solid fraction in wet) was analyzed for the mean particle diameter $D_{TEM}$ thereof in the same manner as in Comparative Example 2.

Figure 5:
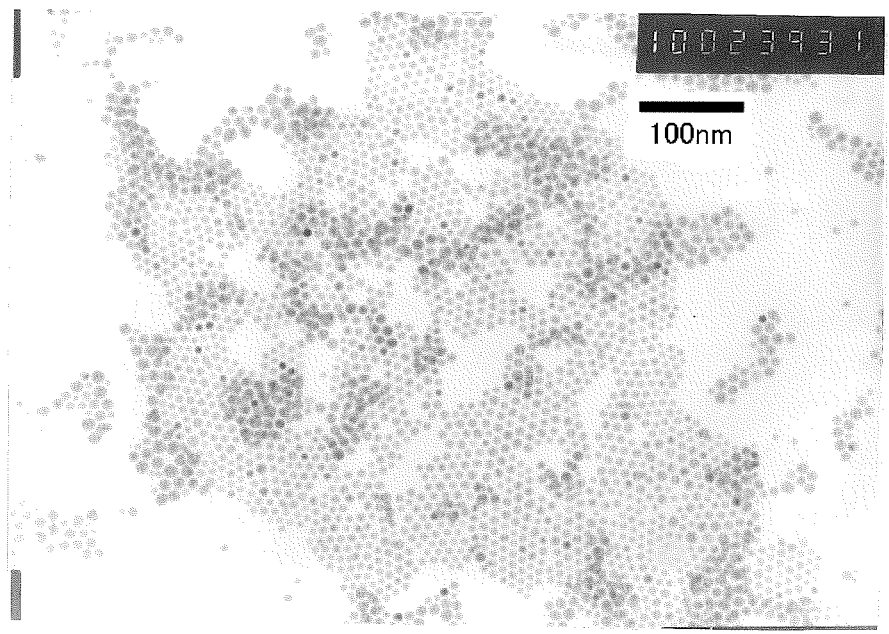
FIG. 5 This is a TEM picture of the silver particles of the case n=6 in Example 1.

For reference, the TEM picture of the silver particles obtained in the case of n=6 in Example 1 is shown in FIG. 5.

[Determination of X-ray Crystal Particle Diameter $D_X$]

The X-ray crystal particle diameter $D_X$ was determined according to the same method as in Comparative Example 2.

[Preparation of Silver Coating Material]

A 50 mas. % silver coating material was prepared according to the same method as in Comparative Example 2.

[Formation of Coating Film]

A coating film was formed according to the same method as in Comparative Example 2.

[Formation of Fired Film]

This was attained according to the same method as in Comparative Example 2.

[Measurement of Specific Resistivity (Volume Resistivity) of Fired Film]

This was attained according to the same method as in Comparative Example 2.

Example 2

Silver nanoparticles were produced according to "Production of Silver Nanoparticles" described in Comparative Example 1, and a silver particle dispersion of the silver particles coated with amine A (oleylamine) monodispersed in tetradecane was produced. As the substituting amine B, hexylamine was used here like in Example 1. In this, the time dependency of the low-temperature sinterability of the silver particle dispersion with the hexylamine B-coated silver particles dispersed therein was confirmed.

[Formation of Hexylamine-Substituted Particles]

As the amine B, 42.2 g of a reagent hexylamine ($C_6H_{13}$—$NH_2$, special grade chemical by Wako Pure Chemical Industries) was prepared. The amount corresponds to 5.0 equivalents relative to Ag. For the purpose of promoting the reaction, 50.1 g of isopropyl alcohol (special grade chemical by Wako Pure Chemical Industries) was prepared. Hexylamine and isopropyl alcohol were mixed. Next, the mixture of hexylamine and isopropyl alcohol was added to 18.0 g of the silver particle dispersion obtained according to the method of Comparative Example 1 (in which the amine A coating amount was 8.0% by mass, and the silver concentration was about 50% by mass). Next, the reactor was heated in a water bath up to a liquid temperature of 60° C., and with heating and stirring at 400 rpm, the substitution reaction was continued for 5 hours. When the stirring was stopped, the formation of precipitated particles was confirmed.

[Solid-Liquid Separation and Washing]

220.7 g of methanol (corresponding to 2 times by mass of the reaction liquid) was added to the above reaction liquid. This was added for promoting the precipitation. For 30 minutes after the addition, the liquid was stirred and mixed, and then kept static for 12 hours. After thus kept static, the supernatant was removed for solid-liquid separation. The resulting precipitate was collected, then 80.1 g of methanol was added to the precipitate, stirred for 30 minutes, and then kept static for 12 hours. After thus kept static, the supernatant was removed in the same manner as above for solid-liquid separation. The resulting precipitate was collected, then 80.1 g of methanol was added to the precipitate, stirred for 30 minutes, then centrifuged for 5 minutes for solid-liquid separation, and the solid fraction was collected.

[Preparation of Silver Particle Dispersion]

Decalin was prepared as a liquid organic medium. This was mixed with the above-mentioned, washed solid component, then dispersed and centrifuged for 30 minutes for solid-liquid separation, and the separated liquid was collected. In this liquid, the amine B-coated silver particles are monodispersed.

[TG-DTA of Protective Material]

Figure 4:
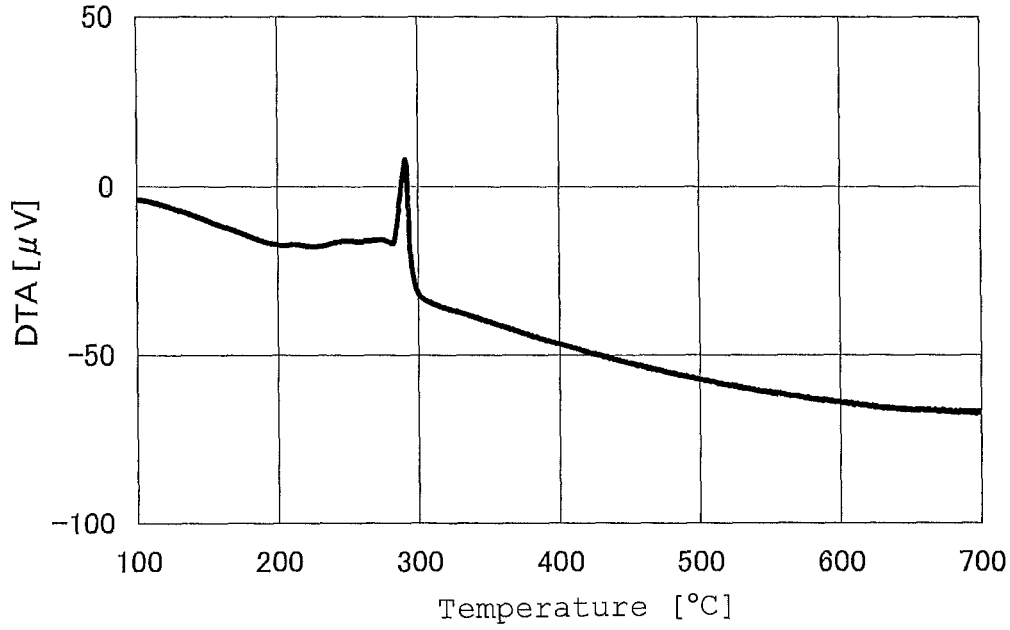
FIG. 4 This is a DTA curve relating to the protective material of the particles used in the silver coating material in Example 2.

The washed solid fraction was analyzed through TG-DTA in the same manner as in Comparative Example 1. The DTA curve is shown in FIG. 4. By comparison between before substitution (FIG. 1) and after substitution (FIG. 4), the peak appearing in FIG. 1 disappeared after substitution, and a new peak was seen. From this, it is considered that the protective material was changed from the amine A (oleylamine) to hexylamine. In this, the loss on heat was 3.3%.

[Determination of Mean Particle Diameter $D_{TEM}$]

The sample powder (hexylamine protective material-coated, washed solid fraction in wet) was analyzed for the mean particle diameter $D_{TEM}$ thereof in the same manner as in Comparative Example 2.

[Determination of X-ray Crystal Particle Diameter $D_X$]

The X-ray crystal particle diameter $D_X$ was determined according to the same method as in Comparative Example 2.

[Preparation of Silver Coating Material]

A 67.5 mas. % silver coating material was prepared according to the same method as in Comparative Example 1. It was recognized that the silver particle dispersion could have coatability as an ink, and therefore, it was used as a silver coating material directly as it was.

[Formation of Coating Film]

A coating film was formed according to a spin coating method like in Comparative Example 1.

[Formation of Fired Film]

In addition to the experiment made according to the same method as in Comparative Example 2, a fired film was formed according to the method mentioned below in this Example.

The substrate with a coating film formed thereon was fired on a hot plate in air at different temperatures of 200° C., 120° C. and 100° C. In this, the substrate was not pre-fired, and the firing time (the retention time for which the substrate was kept at the above temperature) was varied as 5, 10, 30 and 60 minutes. Thus held for the varying retention time, the samples are "200° C. fired film", "120° C. fired film" and "100° C. fired film".

[Measurement of Specific Resistivity (Volume Resistivity) of Fired Film]

The specific resistivity was determined according to the same method as in Comparative Example 2. The results of the fired films formed according to the same method as in Comparative Example 2 are shown in Table 1. The results of the fired films held for the varying retention time as above are shown in Table 2.

As is known from Table 1, the silver nanoparticles coated with the protective material of adsorbed octylamine in Comparative Example 2 were fully sinterable at a low temperature of 120° C., however, when the firing temperature was 100° C., the specific resistivity of the conductive film suddenly increased. As opposed to this, the silver nanoparticles coated with the protective material of adsorbed hexylamine in Examples 1 and 2 stably maintained a sufficiently low specific resistivity even at the firing temperature of 100° C.

Figure 6:
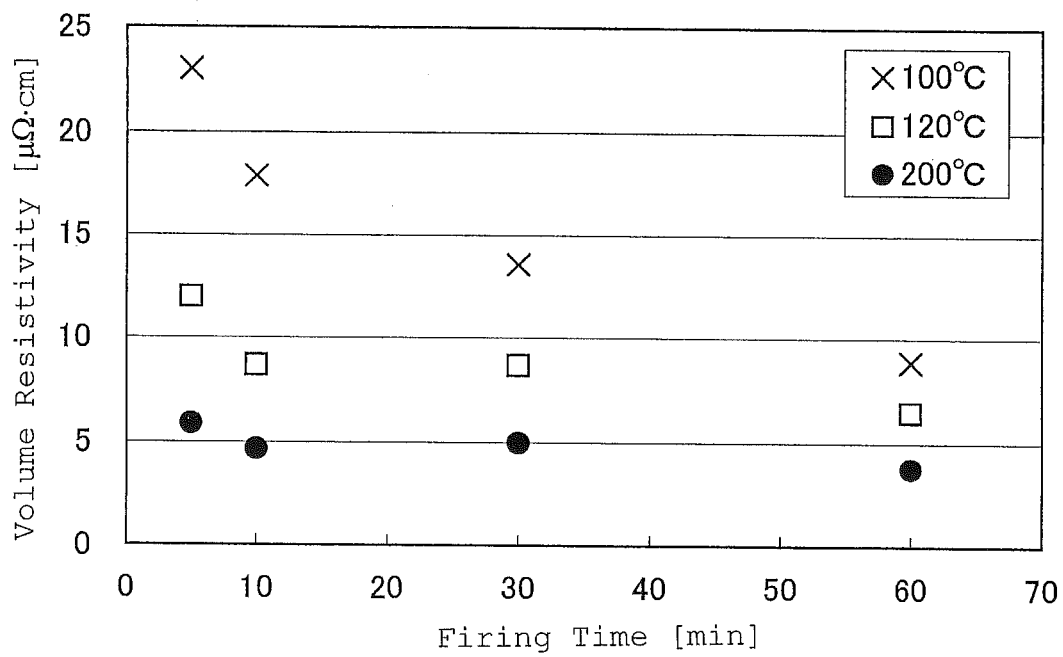
FIG. 6 This is a graph showing the relationship between the firing time and the volume resistivity of the fired film in Example 2.

As also known from Table 2, the coating films had a sufficiently low specific resistivity of not higher than 25 μΩ·cm when fired at 100° C. for a short firing time of 5 minutes without pre-firing. The relationship between these is shown in FIG. 6.

TABLE 1

| Example No. | | Type of Protective Material | | Condition for Substitution Operation | | | | | Particle Diameter | | Constitution | Specific Resistivity of Fired Film (μΩ · cm) | | |
|---|---|---|---|---|---|---|---|---|---|---|---|---|---|---|
| | | Initial Protective Material Amine A | Substituted Protective Material Amine B | Organic Medium | Added Alcohol | Time (h) | Temperature (° C.) | Stirring (rpm) | $D_X$ at 25° C. (nm) | $D_{TEM}$ at 25° C. (nm) | of Protective Material A: amine A B: amine B | 100° C. firing | 120° C. firing | 200° C. firing |
| Comparative Example 1 | | oleylamine | — | — | — | — | — | — | 5.33 | 8.50 | A | — | over load | 3.6 |
| Comparative Example 2 | | oleylamine | octylamine | tetradecane | isopropanol | 5 | 60 | 400 | 5.36 | 9.72 | B | 31.7 | 8.7 | 2.7 |
| Example 1 | n = 1 | oleylamine | hexylamine | tetradecane | isopropanol | 5 | 60 | 400 | 6.20 | 9.37 | B | 8.4 | 5.9 | 3.4 |
| | n = 2 | | | | | | | | 5.94 | 9.33 | B | 11.8 | 9.7 | 3.7 |
| | n = 3 | | | | | | | | 5.22 | 9.74 | B | 10.5 | 7.6 | 4.7 |
| | n = 4 | | | | | | | | 5.36 | 8.62 | B | 9.5 | 6.0 | 3.8 |
| | n = 5 | | | | | | | | 6.47 | 8.41 | B | 10.3 | 5.1 | 5.6 |

TABLE 1-continued

| Example No. | Type of Protective Material Initial Protective Material Amine A | Type of Protective Material Substituted Protective Material Amine B | Condition for Substitution Operation Organic Medium | Condition for Substitution Operation Added Alcohol | Condition for Substitution Operation Time (h) | Condition for Substitution Operation Temperature (°C.) | Condition for Substitution Operation Stirring (rpm) | Particle Diameter $D_X$ at 25° C. (nm) | Particle Diameter $D_{TEM}$ at 25° C. (nm) | Constitution of Protective Material A: amine A B: amine B | Specific Resistivity of Fired Film (μΩ·cm) 100° C. firing | Specific Resistivity of Fired Film (μΩ·cm) 120° C. firing | Specific Resistivity of Fired Film (μΩ·cm) 200° C. firing |
|---|---|---|---|---|---|---|---|---|---|---|---|---|---|
| n = 6 | | | | | | | | 5.52 | 9.25 | B | 7.9 | 6.5 | 3.1 |
| n = 7 | | | | | | | | 6.12 | 9.85 | B | 11.1 | 8.5 | 3.4 |
| Example 2 | oleylamine | hexylamine | tetradecane | isopropanol | 5 | 60 | 400 | 5.05 | 8.89 | B | 12.0 | 8.1 | 4.4 |

TABLE 2

| Example No. | Firing Temperature (°C.) | Specific Resistivity of Fired Film (with no prefiring) (μΩ·cm) 5 min firing | 10 min firing | 30 min firing | 60 min firing |
|---|---|---|---|---|---|
| Example 2 | 100 | 23.0 | 17.9 | 13.6 | 8.9 |
| | 120 | 12.0 | 8.7 | 8.7 | 6.5 |
| | 200 | 5.9 | 4.7 | 5.0 | 3.8 |

The invention claimed is:

1. A method for producing a silver micropowder comprising
a step of reducing a silver compound with a reducing agent of an alcohol or polyol under presence of an amine A having an unsaturated bond and having a molecular weight of from 200 to 400 to obtain coated silver particles with the primary amine A having a mean particle diameter $D_{TEM}$ of from 3 to 20 nm or an X-ray crystal particle diameter $D_X$ of from 1 to 20 nm, a step of mixing the silver particles coated with the primary amine A with a liquid organic medium to be silver particles monodispersed in the liquid organic medium, a step of mixing the silver particle dispersion and hexylamine, a step of keeping the mixture liquid at 5 to 80° C. with stirring to thereby form precipitated particles, and a step of collecting the precipitated particles as a solid fraction through solid-liquid separation.

2. The method for producing a silver micropowder as claimed in claim 1, wherein the primary amine A is oleylamine.

3. A method for producing a silver ink comprising a step of reducing a silver compound with a reducing agent of an alcohol or polyol under presence of an amine A having an unsaturated bond and having a molecular weight of from 200 to 400 to obtain coated silver particles with the primary amine A having a mean particle diameter $D_{TEM}$ of from 3 to 20 nm or an X-ray crystal particle diameter $D_X$ of from 1 to 20 nm, a step of mixing the silver particles coated with the primary amine A with a liquid organic medium to be silver particles monodispersed in the liquid organic medium, a step of mixing the silver particle dispersion and hexylamine, a step of keeping the mixture liquid at 5 to 80° C. with stirring to thereby form precipitated particles, a step of collecting the precipitated particles as a solid fraction through solid-liquid separation, a step of washing the collected solid fraction, and a step of dispersing the washed solid fraction in a liquid organic medium S.

4. The method for producing a silver ink as claimed in claim 3, wherein the primary amine A is oleylamine.

5. A method for producing a silver coating material comprising a step of reducing a silver compound with a reducing agent of an alcohol or polyol under presence of an amine A having an unsaturated bond and having a molecular weight of from 200 to 400 to obtain coated silver particles with the primary amine A having a mean particle diameter $D_{TEM}$ of from 3 to 20 nm or an X-ray crystal particle diameter $D_X$ of from 1 to 20 nm, a step of mixing the silver particles coated with the primary amine A with a liquid organic medium to be silver particles monodispersed in the liquid organic medium, a step of mixing the silver particle dispersion and hexylamine, a step of keeping the mixture liquid at 5 to 80° C. with stirring to thereby form precipitated particles, a step of collecting the precipitated particles as a solid fraction through solid-liquid separation, a step of washing the collected solid fraction, and a step of mixing the washed solid fraction with an organic medium to make the mixture have a coatable property.

6. The method for producing a silver coating material as claimed in claim 5, wherein the primary amine A is oleylamine.

* * * * *